United States Patent [19]

Yokota et al.

[11] Patent Number: 4,868,590
[45] Date of Patent: Sep. 19, 1989

[54] CAMERA WITH CHANGEABLE FOCAL LENGTH

[75] Inventors: Mitsuo Yokota, Saitama; Hiroshi Komatsuzaki, Tokyo, both of Japan

[73] Assignee: Fuji Photo Film Co., Ltd., Kanagawa, Japan

[21] Appl. No.: 260,047

[22] Filed: Oct. 20, 1988

[30] Foreign Application Priority Data

Oct. 20, 1987 [JP] Japan .................. 62-264984

[51] Int. Cl.$^4$ .......................... G03B 3/10
[52] U.S. Cl. .................. 354/195.1; 354/173.1
[58] Field of Search ............ 354/195.1, 195.12, 253, 354/173.1, 173.11

[56] References Cited

U.S. PATENT DOCUMENTS 4,669,848  6/1987  Wakabayashi ............ 354/195.12 X

Primary Examiner—Michael L. Gellner
Attorney, Agent, or Firm—Young & Thompson

[57] ABSTRACT

A photographic camera with changeable focal length has a reversible motor used both to wind and to rewind a film and also to move a taking lens in order to shift it between first and second photographic modes. A lens barrier is caused to open and close by a barrier operating member, for protecting the taking lens, and by a motor control circuit. The circuit includes two change-over switches one of which is connected to one of two motor terminals, an encoder connected to the other motor terminal for shifting the circuit between a film drive mode selected when the taking lens is in either one of the two modes and a taking lens drive mode upon changing the taking lens between the first and second modes. The encoder has first and second mode selecting contacts at which the encoder stops the motor to select the first and second modes, respectively. A photographic mode selecting switch is connected between the first mode selecting contact and the other of the change-over switches for actuating the motor to rotate regardless of the selected mode of the circuit. A first power switch is provided, for disconnecting the motor from a power source when the lens barrier is fully closed; and a second power swwitch is provided, connected between the second mode selecting contact and the mode selecting switch for disconnecting the motor from the power source when the barrier operating member opens the lens barrier.

7 Claims, 5 Drawing Sheets

CAMERA WITH CHANGEABLE FOCAL LENGTH

FIELD OF THE INVENTION

The present invention relates to a camera equipped with a lens barrier, and more particularly to a camera equipped with a lens barrier, of which a taking lens can be changed suitably for, for example, wide-angle photography or telephotography by varying the focal length thereof.

BACKGROUND OF THE INVENTION

For easy photography, modern compact cameras are equipped with various automatic features such as automatic film winding and rewinding, automatic exposure, automatic focusing and so forth. Some such automatic compact cameras are provided with taking lenses of the type in which the focal length can be various between, for example, a relatively short focal length of about 45 mm suitable for standard photography and a relatively long focal length of about 70 mm suitable for telephotography. For automatically varying the focal length of the taking lens in such a camera, a motor driven mechanism is provided to move the taking lens back and forth. It is preferable to provide a single reversible electronic motor used commonly for varying the focal length of the taking lens and winding and rewinding the film. The motor is controlled to rotate in a normal directions so as to move the taking lens back or forth to vary the focal length when a photographic mode selecting switch is operated or to advance a film to wind it up by one frame in cooperation with the operation of a shutter release button for exposure, and to rotate in the reverse direction so as to rewind the film after the exposure of all the frames of a roll of film. For performing this motor control, the camera is equipped with a microcomputer or logical control means.

A recent tendency in such cameras is to provide a lens barrier adapted to open and close for protecting the taking lens in non-use. In order to open the lens barrier, the camera is provided with means such as a lever or a knob which is manually operated to open and close the lens barrier. In cooperation with the manual operation of the means, an electric switch is turned on and off to supply and cut power for actuating various electric and/or electronic elements of the camera.

The lens barrier is closed to protect the taking lens in the position in which the lens is moved back or sunk within the camera body, in which position the taking lens is preferably positioned suitably for standard photography. Therefore, once the telephotography mode has been selected, the means has to be operated to close the lens barrier only after the photographic mode selecting lever is operated to move the taking lens back within the camera body. The means will be sometimes accidentally operated without a preceding operation of the photographic mode selecting lever to change the taking lens back to the standard photographic mode. As one measure to deal with such a misoperation, the motor is adapted to continue its rotation even when the lens barrier is obstructed by the taking lens in its forward position and is stopped when the means is operated while the taking lens is in a position suitable for telephotography, so that the lens barrier is closed only after the taking lens is moved back and sunk within the camera body. This operation control of the barrier can also be performed by the microcomputer or the logic sequential control means as well as the motor control.

Due to the provision of the feature of changeable focal length, the conventional photographic cameras with changeable focal length as described above have unavoidably required a microcomputer or a logic sequential control means for controlling the operations of film winding and rewinding, taking lens shifting, lens barrier opening and closing, and motor rotation. Providing a microcomputer or a logic sequential control means makes a camera control circuit quite complicated. Such a complicated camera control circuit is often a cause of corresponding trouble for the camera and increases the cost of the camera.

OBJECTS OF THE INVENTION

It is, therefore, an object of the present invention to provide a camera with changeable focal length which has a simple, low cost circuit with mechanical switching means.

It is another object of the present invention to provide a camera with changeable focal length which has a simple circuit with mechanical switching means for not only changing the focal length of the camera but also controlling film winding and rewinding.

It is still another object of the present invention to provide a camera with changeable focal length having a lens barrier which is reliably operated to open and close by means of a simple control circuit with mechanical switching means.

SUMMARY OF THE INVENTION

According to a preferred embodiment of the present invention, a photographic camera with a focal length changeable taking lens system has a single reversible motor which is commonly used to wind and rewind a film and to drive a taking lens system in order to shift it between at least first and second photographic modes, for example a telephotographic mode and a wide-angle photographic mode, and a motor drive control circuit. The motor control circuit comprises a pair of mechanical changeover switches one of which is connected to one terminal of the reversible motor, an encoder connected between the other terminal of the reversible motor and the other of the pair of changeover switches for shifting the motor drive control circuit between a film drive mode selected when the taking lens system is in either one of the two photographic modes and a taking lens system drive mode upon changing the taking lens system between the at least first and second photographic modes, and a photographic mode selecting switch for actuating the motor to rotate regardless of the selected mode of said motor drive circuit.

According to another feature of the present invention, a photographic camera with a focal length changeable taking lens system has a single reversible motor which is commonly used to wind and rewind a film and to drive a taking lens system in order to shift it between at least first and second photographic modes, for example a telephotographic mode and a wide-angle photographic mode, a lens barrier disposed in front of the taking lens system for protecting the same, the lens barrier being operated to open and close through an external barrier operating member; and a motor drive control circuit. The motor control circuit comprises a pair of mechanical changeover switches one of which is connected to one terminal of the reversible motor, an encoder connected to the other terminal of the reversible motor for shifting the motor drive circuit between a film drive mode selected when the taking lens system in any one of the photographic modes and a taking lens system drive mode upon changing the taking lens system between the at least first and second photographic modes, which encoder has first and second photographic mode selecting contacts at which the encoder stops the motor to select the respective first or second photographic mode, a photographic mode selecting switch connected between the first photographic mode selecting contact of the encoder and the other of the pair of changeover switches for causing the motor to rotate regardless of the selected mode of the motor drive circuit, a first power switch for disconnecting the motor from the power source when the lens barrier is fully closed, and a second main switch connected between the second photographic mode selecting contact of the encoder and the photographic mode selecting switch for disconnecting said motor from the power source when the external barrier operating member is actuated to open the lens barrier.

The motor is changed in the direction of rotation according to the conditions of the changeover switches. When the changeover switches are in a state in which the motor rotates in the normal or film winding direction and the taking lens system is in either on of the two photographic modes, namely a wide-angle photographic mode and a telephotographic mode, the encoder causes the motor control circuit to be in a film winding mode. Upon having made an exposure, the motor is controlled to wind a film by one frame consequently. Upon operating the photographic mode selecting member, the motor is actuated to rotate, shifting the encoder to maintain the connection between the motor and the power source, moving the lens barrel of the taking lens system back or forth to change its focal length, and hence its photographic mode.

When the changeover switches are changed in state, the encoder changes the motor control circuit into a film winding mode so as to rotate the motor in the reverse or film rewinding direction. At this time, because the taking lens system has been in either one of the two photographic modes, the motor control circuit is maintained in the film rewinding mode. If the lens barrel of the taking lens system is in the wide-angle photographic mode in which the lens barrier is retracted inside the camera housing, the operation of the lens barrier operating means to move it to its closed barrier position opens the first power switch to disconnect the motor from the power source.

When the taking lens system is in the telephotographic mode in which the lens barrier protrudes outside the camera housing and the barrier operating means is operated, the first power switch is maintained closed while the second power switch is opened, thereby maintaining the motor connected to the power source, so as to move the lens barrel back to retracted position. The lens barrier consequently closes and opens the first power switch accordingly to disconnect the motor from the power source.

BRIEF DESCRIPTION OF THE DRAWINGS

The following description refers to the accompanying drawings in which like reference characters denote like parts or elements throughout the several views, and in which.

DETAILED DESCRIPTION OF THE INVENTION

Figure 1:
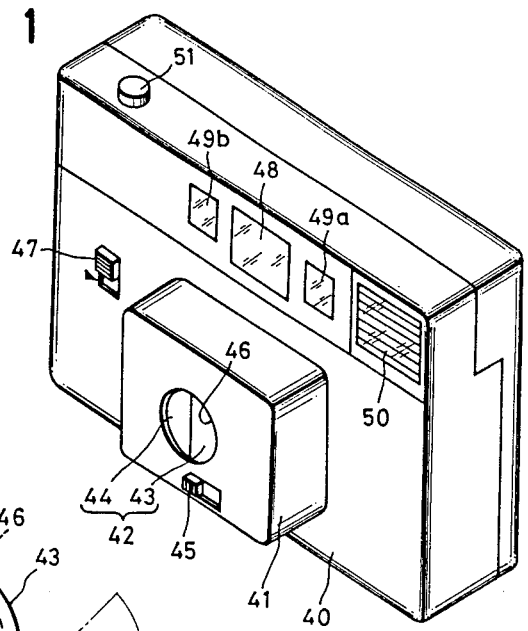
FIG. 1 is a perspective view of a camera in which the present invention is embodied.

Referring now to the drawings, in particular to FIG. 1, there is shown a compact camera with changeable focal length embodying the present invention, which has a camera body provided with a lens housing 41 on the front wall 40. In the lens housing 41 there is a lens cover or lens barrier 42 comprising two barrier blades 43 and 44 which are moved toward and away from each other by a lens barrier operating member 45 in the form of an externally operable slidable knob so as to open and close an opening 46 of the lens housing 41. The camera body is further provided on its front wall 40 with a vertically slidable photographic mode selecting member 47. This photographic mode selecting member 47 is for example pushed up to shift to the wide-angle photographic mode from the telephotographic mode or pushed down to shift to the telephotographic mode from the wide-angle photographic mode. Designated by numerals 48, 49a and 49b, 50 and 51 are a viewfinder window, windows of a rangefinding device, a light-emitting window of a built-in electronic flash provided on the front wall 40, and a shutter release button on the top wall, respectively.

Figure 2:
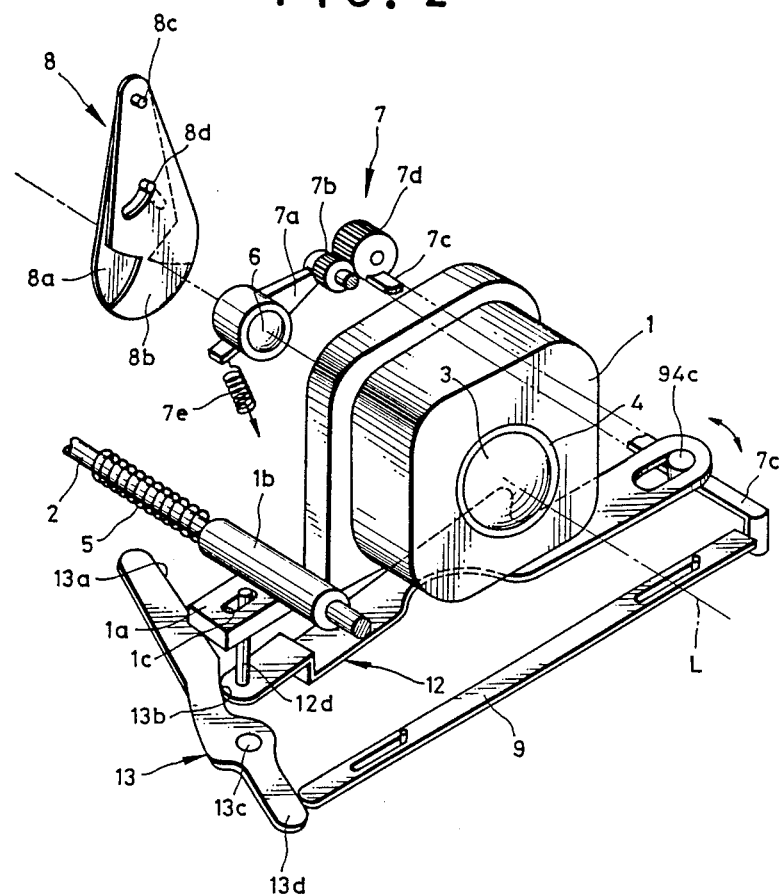
FIG. 2 is an exploded perspective view of a taking lens drive mechanism.

The taking lens system, with its associated elements, is shown in FIG. 2. As shown, a movable lens barrel 1 received in the lens housing 41 supports a lens holder 4 holding a master lens 3 for axial sliding movement. This master lens 3 is positioned at appropriate axial positions to focus according to subject distances detected by the rangefinding device (not shown), which rangefinding device may be of any well known type. On one side of the movable lens barrel 1 there is a fixed lug 1a which is fixed to a guiding sleeve 1b slidably mounting a guide rod 2 extending in parallel with the optical axis L of the master lens 3 for guiding the movable lens barrel 1 when the movable lens barrel 1 axially moves between a forward position wherein the movable lens barrel 1 positions the master lens 3 to select the telephotographic mode and a rear position wherein the movable lens barrel 1 positions the master lens 3 to select the wide-angle photographic mode. A coil compression spring 5 is provided on the guide rod 2 to urge the movable lens barrel 1 toward the telephotographic position.

Behind the movable lens barrel 1, there is a conversion lens 6 which is moved into and out of alignment with the optical axis L of the master lens 3 by a changeover mechanism 7 in cooperation with the back and forth movement of the movable lens barrel 1. The changeover mechanism 7 comprises a swingable arm 7a holding the conversion lens 6 at its one end, a gear 7b fixedly supporting the swingable arm 7a, and a gear 7d carried by a swingable arm 7c. A coil tension spring 73 urges the swingable arm 7a to turn in the counterclockwise direction as seen in FIG. 2 so as to tend to move the conversion lens 6 into axial alignment with the optical axis L.

A shutter 8 is provided behind the conversion lens 6 and is of the well-known type comprising two shutter blades 8a and 8b mounted on a pivot 8c. An actuating pin 8d is engaged in arcuate slots formed in the shutter blades 8a and 8b and moves up and down to move the blades in opposite directions, so as to open and close the shutter 8. As is seen in FIGS. 3A and 3B, a diaphragm 74 is attached to the back of the movable lens barrel 1.

For moving the master lens 3 and the conversion lens 6 in order selectively to change the photographic mode of the camera, there is provided a mode selecting mechanism having a first changing lever 12 for moving the master lens 3 along the optical axis L and simultaneously inserting the conversion lens 6 into the optical axis L. The first changing lever 12 has one end which is in contact with a second changing lever 13 and is provided with a pin 12d disposed in a slot 1c formed in the fixed lug 1a. The second changing lever 13 is formed with a cam section 13b for causing the conversion lens 6 to move into alignment with the optical axis L through a link, and a base section 13a joined to the cam section 13b for maintaining the conversion lens 6 in a position spaced from the optical axis L. The second changing lever 13 turns about a pivot shaft 13c in cooperation with the first changing lever 12 to shift a slidable lever 9 so as to push the swingable arm 7c, thereby turning the gear 7d.

Figure 3A:
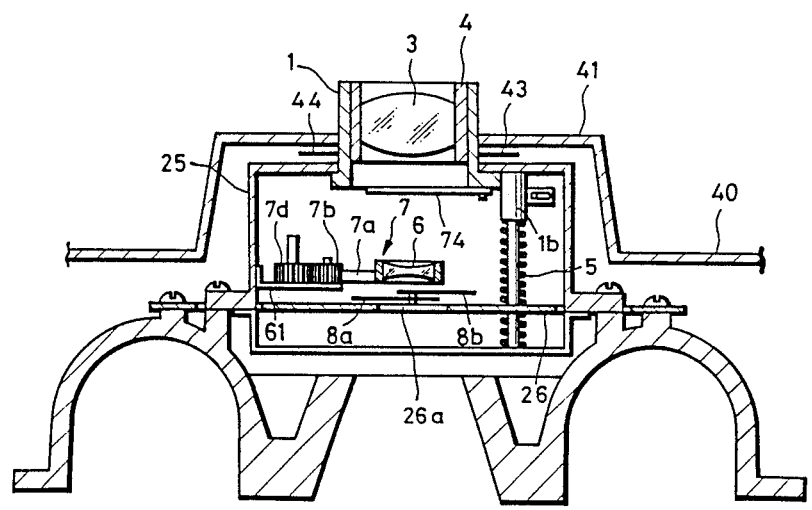
FIGS. 3A and 3B are cross sectional views of an essential part of the camera of FIG. 1 which is in a telephotographic mode and a wide-angle photographic mode, respectively.
Figure 3B:
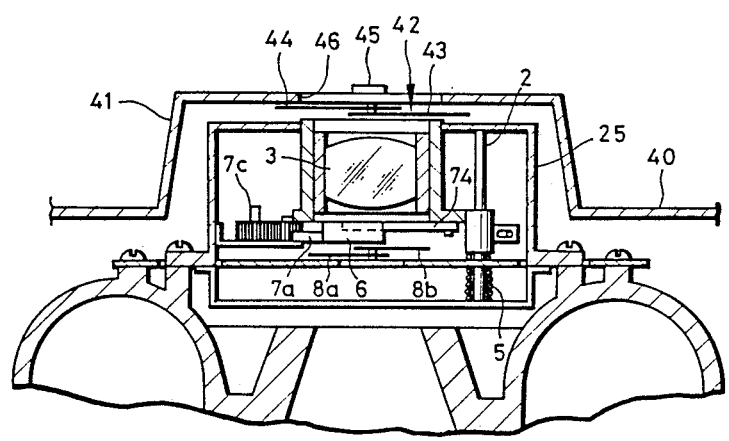

As is illustrated in FIGS. 3A and 3B showing the camera in the telephotographic mode and the wide-angle photographic mode, respectively, within the lens housing 41 there is a fixed barrel 25 in which the movable lens barrel 1 is slidably fitted for axial movement. Between the lens housing 41 and the fixed barrel 25 there is the lens barrier 42 comprising the barrier blades 43 and 44 which are adapted to open and close the opening 46 of the lens housing 41 only when the taking lens system is in the wide photographic mode as is shown in FIG. 3B.

The shutter blades 8a and 8b of the behind-the-lens shutter 8 are mounted on a shutter bearing plate 26 to open and close an exposure aperture 26a formed in the shutter bearing plate 26.

Figure 4:
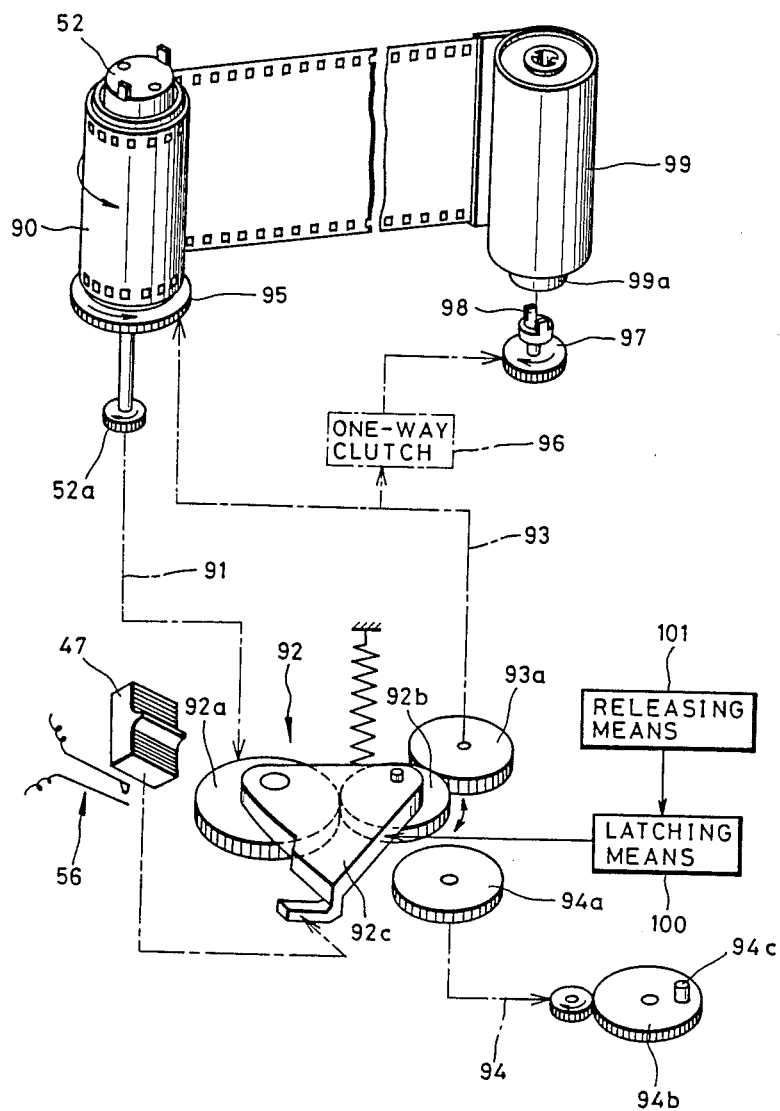
FIG. 4 is an exploded perspective diagram showing the film drive and lens barrel drive mechanisms.

FIG. 4 shows a mechanism for selectively transmitting rotation of a motor to a film winding and rewinding mechanism and a lens barrel driving mechanism. A reversible motor 52 is disposed in a film take-up spool 90. Rotation of the reversible motor 52 is transmitted to a sun gear 92a of a planetary gear set 92 through a gear train 91 coupled to a motor output gear 52a of the reversible motor 52. A planet gear 92b of the planetary gearset 92 is selectively brought into mesh with a gear 93a of a film driving gear train 93 and a lens barrel drive gear train 94. The film driving gear train 93 is coupled directly to a spool gear 95 fixed to the film take-up spool 90 and, through a one-way clutch 96, to a film rewind gear 97 attached to a fork member 98 which engages a spool 99a of a film patrone or cassette 99.

When the photographic mode selecting member 47 is pushed down, a carrier member 92c, coaxially held by a shaft mounting the sun gear 92a and supporting thereon the planet gear 92b for rotation, is turned down, that is, swung clockwise as seen in FIG. 4, to bring the planet gear 92b out of mesh with the first gear 93a of the film drive gear train 93 but into mesh with the first gear 94a of the lens barrel drive gear train 94 having a gear 94b provided with a pin 94c received in a slot formed in the first changing lever 12 (FIG. 2) and is mechanically latched in that swung position by latching means 100. At the same time, the photographic mode selecting switch 56 is turned on to cause the motor 52 to rotate in the normal direction. As a result, rotation of the motor 52 is transmitted not to the film drive gear train 93 but to the lens barrel drive gear train 94. When the movable lens barrel 1 is moved to a predetermined position, releasing means 101 acts on the latching means 100 to release the carrier member 92c, allowing it to be turned back, that is, counterclockwise as seen in FIG. 4, by a spring and to bring gear 92b into mesh with the first gear 93a of the film drive gear train 93.

Figure 5:
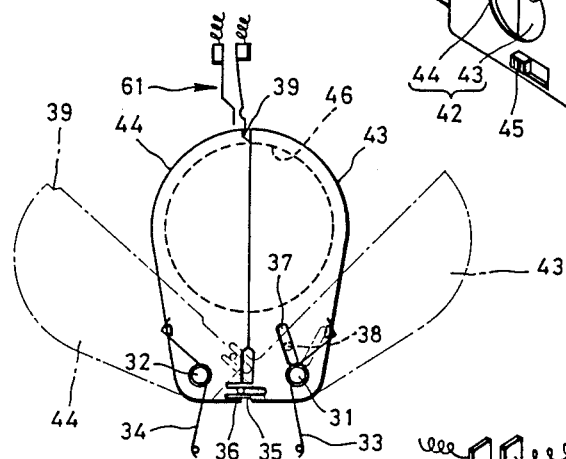
FIG. 5 is a front view of a lens barrier incorporated in the camera of FIG. 1.
Figure 6:
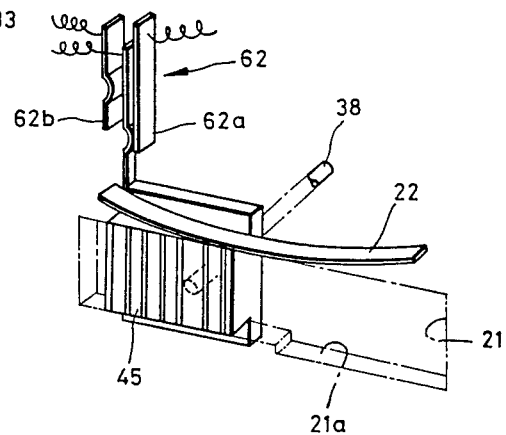
FIG. 6 is a perspective view of a lens barrier operating member with its associated elements.

Referring now to FIGS. 5 and 6, there are shown details of the lens barrier 42 and barrier operating member 45. As shown, the barrier blades 43 and 44 are pivoted at 31 and 32 and are urged by springs 33 and 34 to turn in opposite directions, so as to close the opening 46 of the lens housing 41 of the camera. At the lower end of the barrier blade 43 there is formed a hook 35 slidably receiving a pin 36 attached to the barrier blade 44. In the barrier blade 43 there is further formed a slot 37 which slidably receives therein a pin 38 extending from the barrier operating member 45 (see FIG. 6). At the upper end of the barrier blade 44 there is formed a notch 39 which bears against the first main switch 61 and opens it when blade 44 is in its closed position as shown by solid lines in FIG. 5.

As is shown in FIG. 6, the barrier operating member 45 provided with the pin 38 slidably received in the slot 37 of the barrier blade 43 is slidably received in a guide opening 21 in housing 41 with a stepped recess 21a at its lower right. In the guide opening 21 there is a leaf spring 22 for pressing down the barrier operating member 5. When the barrier operating member 45 is slid to its open barrier position, it is forced to fall into the stepped recess 21a by the leaf spring 22. On the left side of the guide opening 21 there is a second main switch 62 which is usually in contact with an inactive contact 62a and is brought into contact with an active contact 62b by movement of the barrier operating member 45 to its closed barrier position.

When the barrier operating member 45 is slid to the open barrier position and falls into the stepped recess 21a, the barrier blade 43 with its slot 37 receiving the pin 38 of the barrier operating member 45 is turned in the clockwise direction against the action of the spring 33, thereby turning the barrier blade 44 in the opposite direction against the spring 34. Consequently, the barrier blades 43 and 44 open the opening 46 of the lens housing 41. Because the barrier operating member 45 is retained in the stepped recess 21a of the guiding opening 21, the barrier blades 43 and 44 are maintained opened against the action of the springs 33 and 34. Upon pushing the barrier operating member 45 up, however, the barrier blades 43 and 44 are forced by the springs 33 and 34 to close.

Figure 7:
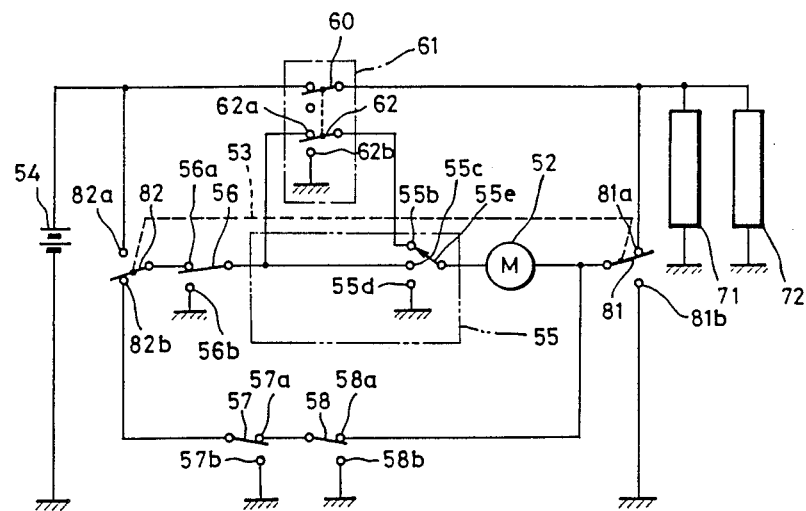
FIG. 7 is a motor control circuit incorporated in the camera of FIG. 1.
Figure 8:
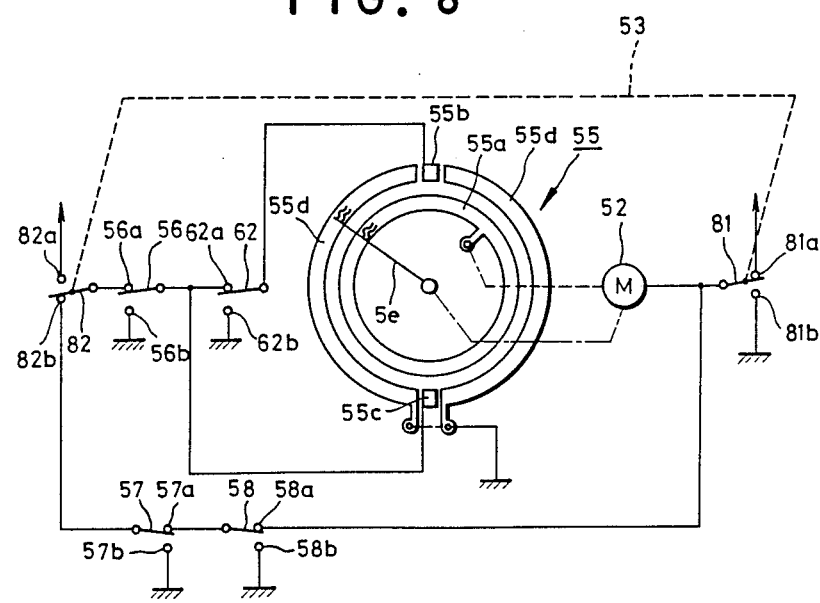
FIG. 8 is an illustration of an encoder of the motor control circuit of FIG. 6.

The camera cooperates with the camera control circuit including a barrier control circuit shown in FIGS. 7 and 8. There is provided in the control circuit main switching means 60 having the first and second main switches 61 and 62. As was previously described, the first main switch 61 coacts with the lens barrier 42 so as to be turned on when the lens barrier 42 is opened and to be turned off when the lens barrier 42 is fully closed. On the other hand, the second main switch 62 coacts with the barrier operating member 45 so as to be connected to a contact 62a to turn on when the barrier operating member 45 is moved to the position to open the lens barrier 42 and otherwise to be connected to a ground contact 62b to turn off.

The reversible motor 52 is provided not only to move a film in a direction to wind it up or to rewind it but also to change the taking lens system between the possible two photographic modes. The motor 52 is connected to a power source 54 through the first main switch 61 and a first rewind switch 81 of a film rewind switch means 80 having an inactive contact 81a connected to the first main switch 61 and an active contact 81b connected to the ground. A second rewind switch 82 of the film rewind switch means 80 coacts with the first rewind switch 81. As is apparent in FIG. 7, the second rewind switch 82 is connected to the power source 54 through its active contact 82a and to the ground through its inactive contact 82b and a one-frame metering switch 57 which will be described in detail later. The first and second rewind switches 81 and 82 of the film rewind switch means 80 coact with each other to connect the active contacts 81a and 82a, respectively either when an exposure of the last available frame of the film is detected or when the film rewind switch means 80 is manually operated with the intention of rewinding the film at any time. It is to be noted that the first and second rewind switches 81 and 82 are usually connected to the inactive contacts 81b and 82b, respectively.

The motor 52 is connected to the photographic mode selecting switch 56 (FIG. 4) and cooperates with the photographic mode selecting member 47 through an encoder 55 provided with contact members corresponding to axial positions wherein the movable lens barrel 1 is positioned according to the selected photographic modes. This photographic mode selecting switch 56 is usually connected to its inactive contact 56a connected to the second rewind switch 82. When the photographic mode selecting member 47 is manually operated, the photographic mode selecting switch 56 is connected to its active contact 56b connected to the ground. Connected to the main switching means are a shutter control circuit 71 and a built-in electronic flash control circuit 72 which may have any well known construction.

As is shown in FIG. 8, the encoder 55 has a common inner circular contact 55a, outer semi-circular contacts 55d connected to the ground and a telephotographic mode selecting contact 55b and a wide-angle photographic mode selecting contact 55c disposed diametrically oppositely between the semi-circular contacts 55d. A brush 33e in contact with both the inner and outer contacts cooperates with a lens barrel drive gear train 94 driven by the motor 52. The telephotographic mode selecting contact 55b is connected to the photographic mode selecting switch 56 through the second main switch 62 and the wide-angle photographic mode selecting contact 55c directly to the photographic mode selecting switch 56.

The one-frame metering switch 57 connected to the inactive contact 82b of the second rewind switch 82 is usually connected to its inactive contact 57a which is connected to an initial film winding switch 58 which cooperates with a frame counter (not shown but well known in the art). This initial film winding switch 58, which acts to allow the first several frames of a loaded film to be automatically wound up, is usually connected to its inactive contact 58a connected to the first rewind switch 81. Each active contact 57b, 58b of the one-frame metering switch 57 and the initial film winding switch 58 is connected to the ground.

The camera constructed as above cooperates with the camera control circuitry shown in FIGS. 7 and 8 which is in a condition that sets the camera to the telephotographic mode as shown in FIG. 3A. In the telephotographic setting condition of the camera control circuit, the film rewinding switch means 80, the photographic mode selecting switch 56, the one-frame metering switch 57, and the initial film winding switch 58 are all turned off but the main switch 60 is turned on. The brush 55e of the encoder 55 is in contact with the telephotographic mode selecting contact 55b. As is shown in FIG. 3A, the movable lens barrel 1 of the taking lens is in the protruding or telephotographic position.

When the camera is in the telephotographic mode and an exposure is made, the one-frame metering switch 57 is turned on to connect the power source 54 to the motor 52 through the first main switch 61, the first rewinding switch 81, the encoder 55, the second main switch 62, the photographic mode selecting switch 56, the second rewinding switch 82, and the on-frame metering switch 57. The motor 52 is energized to rotate in the normal or film winding direction so as to wind up the film on a film take-up spool. Upon the one-frame metering switch 57 being turned off, the motor 52 is disconnected from the power source 54, so that the motor 52 stops. Thus a one-frame advance of the film is performed.

After an exposure or exposures have been made by the camera set to the telephotographic mode, if the photographic mode selecting member 57 is operated or pushed down, the photographic mode selecting switch 56 is turned on to connect the motor 52 to the power source, so that the motor 52 is energized to rotate in the normal direction. The movable lens barrel 1 consequently begins to move back under the impetus of the lens barrel driving mechanism in cooperation with the motor 52. In more detail, when the motor 52 turns slightly, the brush 55e of the encoder 55 is brought out of contact with the telephotographic mode selecting contact 55b but into contact with the outer semi-circular contact 55d to maintain the transmission of power to the motor 52 from the power source 54 even when the photographic mode selecting member 47 is released and the photographic mode selecting switch 56 is turned off. Once the photographic mode selecting member 47 is operated, the motor 52 continues to rotate in the normal direction, so that the movable lens barrel 1 is continuously moved back. At the moment the brush 55e of the encoder 55 transits from the outer semi-circular contact 55d to the wide-angle photographic mode selecting contact 55c, the motor 52 is disconnected from the power source 54 to stop, placing the movable lens barrel 1 in the position wherein the taking lens system is adjusted suitably for wide-angle photography. In such a way, the camera is changed to the wide-angle photographic mode.

For changing the camera to the telephotographic mode from the wide-angle photographic mode, the photographic mode selecting member 47 is pushed down to turn on the photographic mode selecting switch 56. As a result, the motor 52 begins to rotate in the normal direction. At the moment the motor 52 turns slightly in the normal direction, the brush 55e of the encoder 55 is turned so as to be brought out of contact with the wide-angle photographic mode selecting contact 55c but into contact with the outer semi-circular contact 55d. By the rotation of the motor 52 in the normal direction, the movable lens barrel 1 is moved forward and the brush 55e slides over the outer semi-circular contact 55d to the telephotographic mode selecting contact 55b. As soon as the brush 55e contacts the telephotographic mode selecting contact 55b, the motor 52 stops, placing the movable lens barrel 1 in the position wherein the taking lens system is adjusted suitably for telephotography. In such a way, the camera is changed to the telephotographic mode from the wide-angle photographic mode.

As s well known, when carrying the camera, the lens barrier 42 is closed to protect the lens. For closing the lens barrier 42, the lens barrier operating member 45 is operated. If the movable lens barrel 1 is fully retracted within the lens housing 41, the barrier blades 43 and 44 are not obstructed and so can fully close. Thus the barrier 42 closes fully the opening 46 of the lens housing 41, as is shown in FIG. 4. The lens barrier operating member 45, when operated to close the lens barrier 42, turns off the second main switch 62. Furthermore, the barrier blades 43 and 44, when fully closed, open the first main switch 61 to shut off the supply of power to various electric elements of the camera.

On the other hand, if the camera is in the telephotographic mode and the movable lens barrel 1 protrudes outside the lens housing 41, the barrier blades 43 and 44 are obstructed by the barrel 1, so that the second main switch 62 is turned off to contact the ground contact 62b while the first main switch 61 is maintained on. As a result, the second main switch 62 connects the transmission of power from th battery 54 to the motor 52, so as to actuate the motor 52 to rotate in the normal direction, driving the movable lens barrel 1 through the lens barrel driving mechanism. When the motor 52 slightly rotates, the brush 55e of the encoder 55, although brought out of contact with the telephotographic mode selecting contact 55b of the encoder 55, is brought into contact with the outer semi-circular contact 55d, thereby allowing the motor 52 to rotate in the normal direction. When the brush 55e reaches the wide-angle photographic mode selecting contact 55c, then the motor 52 stops. Owing to the continuous rotation of the motor 52, the movable lens barrel 1 is moved back and retracted within the lens housing 41, allowing the barrier blades 43 and 44 to close so as to close the opening 46 of the lens housing 41. At the moment the lens barrier 42, in particular the barrier blade 44, fully closes, it opens the first main switch 61 to disconnect the transmission of power from the battery 54 to the motor 52.

Film rewinding is effected by actuating the film rewind switch mean 80 either automatically when the last frame of a roll of film in the camera is exposed or manually when a film rewind operating member is operated. When the film rewind switch mans 80 is actuated, the first and second film rewind switches 81 and 82 are turned to contact the active contacts 81b and 82a, respectively. As a result, the motor 52 is connected to the power source 54 through the second film rewind switch 81, the photographic mode selecting switch 56, the encoder 55 and the first film rewinding switch 81 and rotates in the reverse direction, thereby driving a film rewinding mechanism not shown but well known in the art to rewind the exposed film.

Upon initial loading of a roll of film, the one-frame metering switch 57 is turned to contact the active contact 57b to cause the motor 52 to rotate in the normal direction so as to start the winding of the film. When the film is wound up by a predetermined length, for example a half of one frame, the initial film wind switch 58 is turned to contact the active contact 58b. Because the motor 52 is maintained connected to the power source through the initial film wind switch 58 while the one-frame metering switch 57 is turned off every one frame film winding, the motor continues to rotate in the normal direction to wind up the film. Thereafter, when the film is wound up by a predetermined number of frames, for example three and one half frames, the initial film wind switch 58 is turned off. However, because the film is wound by the first three and one half frames, the one-frame metering switch 57 is in contact with the active contact 57b, and the motor 52 continues to rotate. At the moment the film is further wound by a half of one frame, the one frame metering switch 57 is turned off and the motor 52 stops. In such a way, the initial film loading is completed by continuously winding up the film by four frames.

It is to be noted that the present invention may be applied to pre-winding cameras of the type in which a film is fully wound immediately after film loading and is rewound by one frame every exposure. In this case, the encoder 55 and the photographic mode selecting switch 56 are connected between the motor 52 and the first film rewind switch 81, so as to rotate the motor 52 in the reverse direction for winding up the film and moving the movable lens barrel and in the normal direction for intermittently rewinding the film frame by frame.

It is further to be noted that, in the case of the present invention applied to cameras which have no lens barrier but rather a changeable focal length, the second main switch 62 is omitted and the telephotographic mode selecting contact 55b of the encoder 55 is directly connected to the photographic mode selecting switch 56, and that the encoder 55 and the photographic mode selecting switch 56 may be positionally reversed.

What is claimed is:

1. A photographic camera with changeable focal length of the type having motor driven automatic film winding and rewinding, said photographic camera comprising:
    a single reversible motor which is used both to wind and rewind a film and to move a taking lens system in order to shift it between at least first and second photographic modes;
    a pair of switch means, one of said pair of switch means being connected to one terminal of said reversible motor;
    an encoder connected between the other terminal of said reversible motor and the other of said pair of switch means for shifting a motor drive circuit between a film drive mode selected when said taking lens system in any one of said photographic modes and a taking lens system moving mode upon changing said taking lens system between said at least first and second photographic modes; and
    a photographic mode selecting switch for actuating said motor to rotate regardless of which of said modes is said selected mode of said motor drive circuit.

2. A photographic camera as defined in claim 1, wherein said first and second photographic modes include at least a wide-angle photographic mode.

3. A photographic camera as defined in claim 1, wherein said first and second photographic modes include at least a telephotographic mode.

4. A photographic camera as defined in claim 1, wherein said photographic mode selecting switch is operated through an externally operable member.

5. A photographic camera with changeable focal length of the type having motor driven automatic film winding and rewinding, said photographic camera comprising:
- a single reversible electric motor having two terminals, which is used both to wind and rewind a film and to move a taking lens system in order to shift it between at least first and second photographic modes;
- a lens barrier disposed in front of said taking lens system for protecting the same, and an external barrier operating member for causing said lens barrier to open and close;
- a pair of switch means, one of said pair of switch means being connected to one terminal of said reversible motor;
- an encoder connected to the other terminal of said reversible motor for shifting a motor drive circuit between a film drive mode selected when said taking lens system is in any one of said photographic modes and a taking lens system drive mode upon changing said taking lens system between said at least first and second photographic modes; said encoder having first and second photographic mode selecting contacts at which said encoder stops said motor to select said first and second photographic modes, respectively,
- a photographic mode selecting switch connected between said first photographic mode selecting contact of said encoder and the other of said pair of switch means for actuating said motor to rotate regardless of said selected mode of said motor drive circuit;
- a first power switch for disconnecting said motor from a power source when said lens barrier is fully closed; and
- a second power switch connected between said second photographic mode selecting contact of said encoder and said photographic mode selecting switch for disconnecting said motor from said power source when said external barrier operating member is moved to open said lens barrier.

6. A photographic camera as defined in claim 5, wherein said first and second photographic modes are a wide-angle photographic mode and a telephotographic mode, respectively.

7. A photographic camera as defined in claim 5, wherein said photographic mode selecting switch is operated through an externally operable member.

* * * * *